July 17, 1951  D. N. WALKER  2,561,300
INDUSTRIAL TRUCK
Filed Sept. 24, 1949
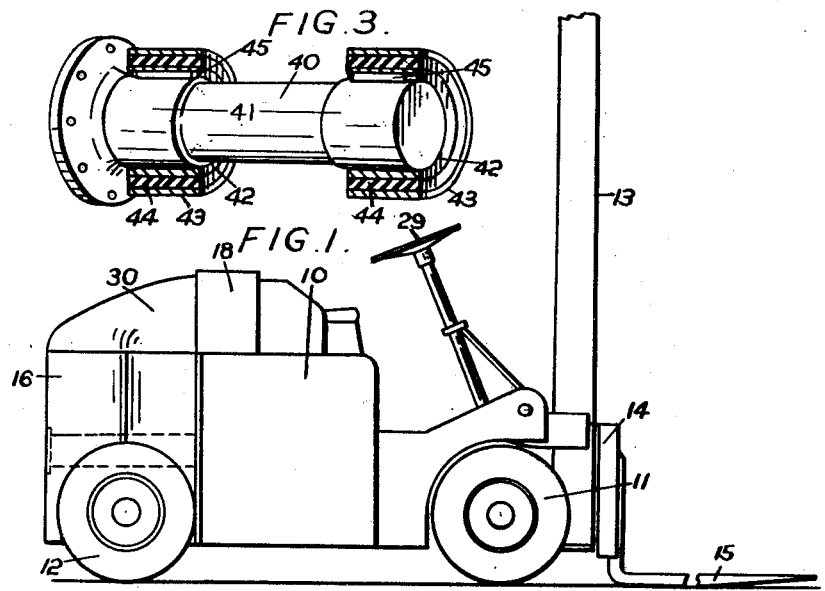
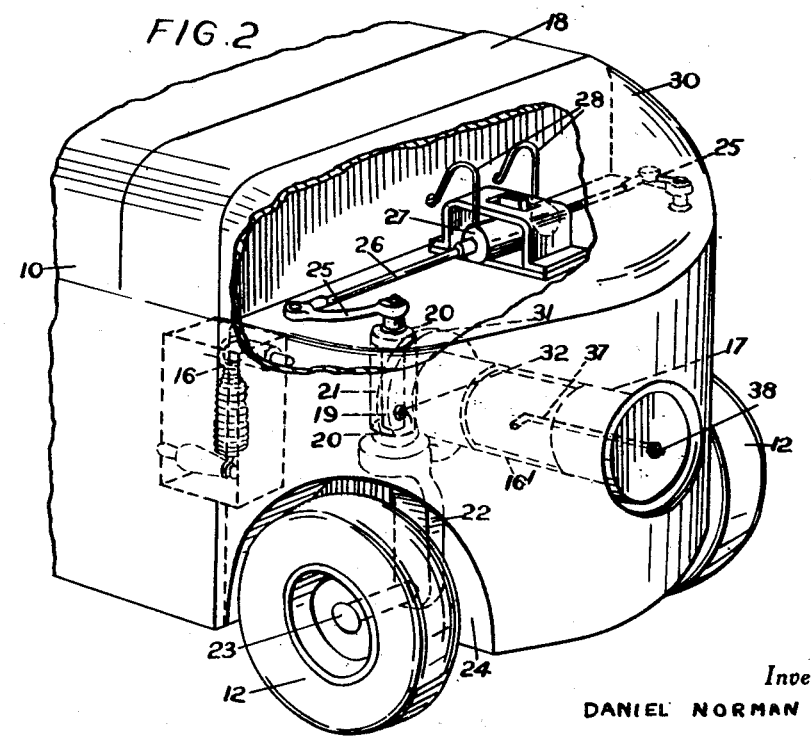
Inventor
DANIEL NORMAN WALKER
Attorney Patented July 17, 1951

2,561,300

UNITED STATES PATENT OFFICE 2,561,300

INDUSTRIAL TRUCK

Daniel Norman Walker, Birmingham, England, assignor to Coventry Climax Engines Limited, Coventry, England, a British company Application September 24, 1949, Serial No. 117,520
In Great Britain September 24, 1948

2 Claims. (Cl. 214—113)

Trucks of the kind which have a load carrying platform or the like projecting beyond the wheelbase of the truck, require counterbalancing means to prevent the truck from tipping, especially when heavy loads are to be carried. Counterbalancing is particularly important for the type of truck known as a "fork-truck" which has a raisable load carrying platform or fork members projecting ahead of the vehicle.

The present invention is designed to provide a new or improved construction and arrangement for ballast or counterbalance weights for trucks of the kind referred to.

A further object is to provide a truck having a load carrying platform at one end, and a substantially solid portion at its opposite end to serve as a counterweight, the said counterweight portion being pivotally connected to the main portion of the truck for rocking movements about a central longitudinal axis, the road wheels for the counterweight end of the truck being carried by the counterweight portion. The counterweight portion may have recesses to accommodate the road wheels the bearings for which latter may be carried by brackets mounted in vertical bearings in the counterweight portion so that these road wheels will be steerable. The counterweight portion may be adjustable longitudinally relative to the main portion of the truck so as to provide increased leverage for counterbalancing exceptionally heavy loads.

For a better understanding of the invention, reference may be had to the accompanying drawings which show one construction for counterbalancing a fork truck, together with a detail modification, by way of example only.

In the drawings:

Figure 1 is a more or less diagrammatic side view of a fork truck provided with counterbalance means according to the invention, Figure 2 is a perspective view, partly broken away, of the rear end of the truck shown in Figure 1, and Figure 3 is a detail perspective view, partly in section, showing an alternative mounting for the counterweight portion.

Referring to the particular construction shown in the drawings the invention is applied to a fork truck comprising a body portion 10 supported by front road wheels 11 and rear road wheels 12. The truck is provided with a substantially vertical but tiltable mast 13 at its front end immediately ahead of its front wheels 11, and a carriage 14 is mounted for raising and lowering movements along the mast, the carriage having forwardly projecting load supporting forks or fingers 15. The rear portion 16 of the truck is of heavy construction so as to serve as a counterweight for loads carried by the forks or fingers 15. Motive power for the truck is provided by a driving engine, not shown, mounted in the body portion 10. The motor and the body portion are of conventional construction and the drive is transmitted from the engine to the front wheels 11 in a conventional manner. A central horizontally disposed boom 17 projects rearwardly from a bulkhead 18 at the rear of the body portion 10, and this boom 17 serves as a bearing on which the counterweight portion 16 is mounted by means of a bore 16'. Consequently the counterweight portion 16 is capable of rocking movements about a central longitudinal axis relatively to the main portion of the truck. The counterweight portion 16 has two vertical bores 19, one at each side thereof, and each vertical bore 19 houses bearings 20 for a short vertical shaft 21 which at its lower end carries a bracket 22 for the stub shaft 23 of one of the rear wheels 12. Each bore 19 leads into a recess 24 which accommodates one of the rear wheels 12. A steering arm 25 is secured on the upper end of each shaft 21, and these arms 25 are connected to a steering rod 26 which is actuated by means of a hydraulic motor 27 for steering the rear wheels 12. The hydraulic motor 27 is of conventional construction and has a cylinder the opposite ends of which are connected by means of flexible hoses 28 to hydraulic steering mechanism, not shown, controlled by the steering wheel 29 of the truck. It will be understood that the recesses 24 are shaped to permit steering movements of the rear wheels, the minimum amount of material being removed from the counterweight for this purpose. Hydraulic steering mechanism is particularly suitable because the flexible hose 28 will not be affected by the rocking movements of the counterweight portion 16 relatively to the body portion 10. However, any other suitable type of steering mechanism may be employed but in such case it may be necessary to make provision for accommodating the relative rocking movements between the counterweight portion 16 and the body portion 10. The steering mechanism is enclosed by a cover 30 which may be made readily detachable to allow easy access to the steering mechanism.

The boom 17 has a flange 31 to enable it to be secured to the bulkhead 18 by means of bolts 32, and the bulkhead itself may be detachably secured to the rear end of the frame of the main portion of the truck. Such an arrangement is desirable to allow the counterweight portion to be readily removed from the main portion of the truck for overhauling or servicing of the engine or other parts of the truck.

The rocking movements of the counterweight portion 16 relatively to the body portion 10 may be limited in any convenient manner and suitable shock absorbers provided. In the construction illustrated a recess 33 is formed in each side of the bulkhead 18. Each recess 33 houses a stabilising spring 34 of the lower end of which is anchored to a stud 35 carried by the bulkhead 18 and the upper end is secured to a stud 36 carried by the counterweight portion 16. Only one of these stabilising springs 34 is shown in Figure 2 but it will be understood that an exactly similar arrangement is provided on the opposite side of the truck.

In Figure 2 the boom 17 provides a plain bearing for the counterweight portion 16 and for this reason a lubrication channel 37 extends through the boom and its outer end is provided with a nipple 38. In Figure 3 an alternative arrangement is illustrated which provides an oilless bearing and obviates the need for stabilizing springs. The boom 40 shown in Figure 3 is similar to that illustrated in Figure 2 and has bearing portions 41. Each bearing portion 41 receives the inner ring 42 of a composite metal and rubber bearing which has an outer ring 43 and a rubber sleeve 44 disposed between the inner and outer rings to which it is bonded. The inner rings 42 are secured by keys 45 on the boom 40, and the outer rings 43 are pressed into the bore in the counterweight portion of the truck. It will be seen that with this arrangement a limited amount of rocking movement will be allowed between the counterweight portion and the body portion of the truck, the rubber sleeve 40 serving both to limit this rocking movement and to provide a damping action.

I claim:

1. A truck comprising a body portion, load carrying means at one end of said body portion and a bulkhead at the other end, wheels supporting said load carrying end, a boom fixed in connection with said bulkhead and projecting rearwardly therefrom, a counterweight portion, a bore in said counterweight portion, said boom engaging in said bore whereby said counterweight portion is rockably mounted about a substantially central horizontal axis, means resiliently opposed to and limiting said rocking movements, a vertical bore in each side of said counterweight portion, a shaft rotatable in each bore, a bracket on the lower end of each shaft, a steerable wheel carried by each bracket, and steering mechanism connected to the upper ends of said shafts.

2. A truck comprising a body portion, load carrying means at one end of said body portion and a bulkhead at the other end, a boom fixed in connection with said bulkhead and projecting rearwardly therefrom, a counterweight portion, said bulkhead having two recesses in its rear face, one at each side of said boom, with a spring housed in each recess, one end of said spring being anchored to said bulkhead and the other end of said spring being connected to said counterweight portion, a bore in said counterweight portion, said boom engaging in said bore to provide a bearing on which said counterweight portion is rockably mounted about a substantially central horizontal axis, wheels supporting said body portion, and steerable wheels supporting said counterweight portion.

DANIEL NORMAN WALKER

REFERENCES CITED

The following references are of record in the file of this patent:

UNITED STATES PATENTS

| Number | Name | Date |
|---|---|---|
| 2,090,561 | Wagner | Aug. 17, 1937 |
| 2,242,454 | Cochran | May 20, 1941 |
| 2,327,848 | Schroeder | Aug. 24, 1943 |
| 2,337,109 | Johnson | Dec. 21, 1943 |
| 2,477,789 | Dunham | Aug. 2, 1949 |
| 2,504,885 | Schreck | Apr. 18, 1950 |